United States Patent
Bigelow

(10) Patent No.: US 7,780,118 B2
(45) Date of Patent: Aug. 24, 2010

(54) RADIATION SHIELD

(75) Inventor: Robert T. Bigelow, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 858 days.

(21) Appl. No.: 10/901,874

(22) Filed: Jul. 29, 2004

(65) Prior Publication Data
US 2006/0060718 A1      Mar. 23, 2006

(51) Int. Cl.
   *B64G 1/36* (2006.01)
(52) U.S. Cl. .................. 244/171.7; 244/158.1
(58) Field of Classification Search ............. 244/171.7, 244/158.1, 171.9, 171.8, 173.1
   See application file for complete search history.

(56) References Cited
U.S. PATENT DOCUMENTS

| | | | | |
|---|---|---|---|---|
| 4,707,979 A | * | 11/1987 | Gutsche | 60/203.1 |
| 4,770,374 A | * | 9/1988 | Regipa | 244/171.7 |
| 4,971,269 A | * | 11/1990 | Koda | 244/171.7 |
| 5,377,935 A | * | 1/1995 | Larriva et al. | 244/121 |
| 5,472,760 A | * | 12/1995 | Norvell | 428/71 |
| 5,721,333 A | * | 2/1998 | Marrot | 528/327 |
| 6,231,010 B1 | * | 5/2001 | Schneider et al. | 244/158.3 |
| 6,439,508 B1 | * | 8/2002 | Taylor | 244/158.3 |
| 6,481,670 B1 | * | 11/2002 | Bigelow et al. | 244/171.8 |

\* cited by examiner

*Primary Examiner*—J. Woodrow Eldred
(74) *Attorney, Agent, or Firm*—Franklin E. Gibbs

(57) ABSTRACT

A radiation shield for use with a manned spacecraft is claimed. The shield has a container that is substantially filled with a substantially radiation absorbing material. The container has attachment members that cooperate with corresponding attachment members on the inner surface of a spacecraft. The radiation absorbing material provides a measure of protection to crewmembers and equipment against particle radiation that is present in space.

17 Claims, 3 Drawing Sheets

RADIATION SHIELD

BACKGROUND OF THE INVENTION

1. Field of the Invention

This invention relates to a radiation shield for use with a manned spacecraft.

2. Description of the Prior Art

In support of human exploration of space, manned spacecraft must be designed to provide a habitable environment for people in an extraterrestrial setting. A major area of concern in the design and development of such vessels is exposure to dangerous levels of radiation that exist in space.

Space radiation ranges from electromagnetic waves including gamma rays to elementary particles such as electrons, protons, and neutrons to heavier particles including alpha particles. The levels of radiation that exist in space can cause illness, including cancer, and even death to humans. Also, this level of radiation can interfere with the operation of electronic instrumentation vital to the operation of a spacecraft.

Compounding this problem is the fact that many manned space missions are of a long duration. This increased expose to the radiation increases the risk of injury, since damage due to radiation exposure is cumulative. For long interplanetary trips, this risk increases significantly.

Such risks are not manifest on Earth due to the magnetic field, atmosphere, and rotation that limits direct exposure to radiation emitted by the Sun. These factors reduces harmful space radiation on the surface of the planet. Spacecraft, however, must rely upon different types of radiation shielding techniques.

There are a variety of radioactive shielding materials. One such well-known material is Lead. While Lead is effective at shielding against radiation it has drawbacks in a space environment. Particularly with the high cost of placing a payload into space, Lead is not an economically effective solution due to Lead's mass.

Also, Lead can fragment into potentially dangerous secondary particles and reradiate when impacted by high-energy radiation. The characteristic of metals, like Lead, to re-radiate when impacted with high-energy radiation is also known as the Bremsstrahlung effect. This secondary source of radiation is not desirable and may also be harmful.

Hydrogen is another good shielding material. Hydrogen does not fragment when impacted by radiation and does not re-radiate like metals. Further, hydrogen can diffuse or break down radiation. A few disadvantages to using Hydrogen are that it is potentially flammable in its gaseous state and, in that state, tends to permeate through many materials.

One solution is the use of water as a radiation shield. Due to the concentration of Hydrogen in water, the water tends to disperse and break down radiation. Also, water is more easily contained and safer than liquid or gaseous Hydrogen.

Even though water is a good choice for shielding against exposure to space radiation, it also has a relatively substantial mass and a spacecraft completely enclosed in a water blanket radiation barrier would not be practical.

While the use of a radiation absorbing material in space applications is important, the deployment of such a material is equally important. In most cases, a shield is set in place before launch. In such cases, the shield cannot be moved once the spacecraft is deployed into space.

Depending upon such factors as the exposure of any portion of the spacecraft to a radiation source, the displacement of equipment and people within the craft, and the duration of the mission, it may not be necessary, or desirable, to have a radiation shield surrounding the entire craft. Also, the shielding required at some locations may vary depending upon the variables mentioned above.

What is needed is a way of incorporating radiation shields in a spacecraft in a manner that allows the crew to position the shields at optimum locations.

SUMMARY OF THE INVENTION

A radiation shield has a container that is substantially filled with a radiation absorbing material. Attachment members on the container cooperate with corresponding attachment members disposed on the inner surface of a spacecraft.

DETAILED DESCRIPTION OF THE DRAWINGS

The present invention may best be understood by reference to the following description taken in conjunction with the accompanying drawings.

Figure 1:
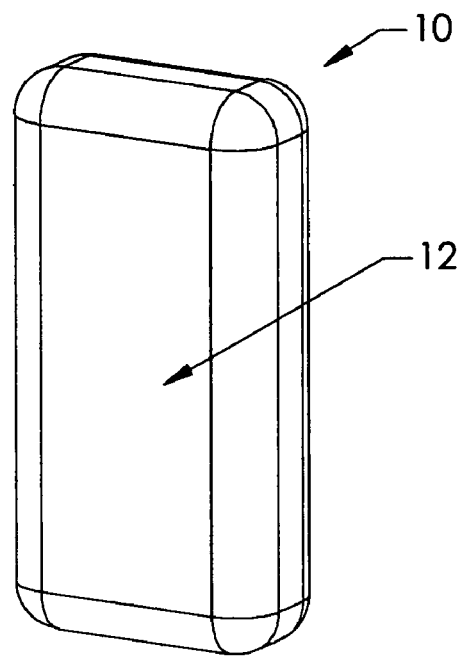
FIG. 1 is a frontal isometric view of a radiation shield.

FIG. 1 is a front view of a radiation shield 10. The shield 10 has a container 12. In the preferred embodiment, the container 12 is substantially filled with water. Alternate embodiments can include other radiation absorbing materials in the form of, but not limited to, liquids, gelatinous or gel type materials, or foam type materials.

Yet other alternate embodiments can include a combination of a radiation absorbing liquid, such as water, and other radiation absorbing materials such as water-soluble chemicals having a high concentration of hydrogen atoms, or Beryllium in solution. While this figure shows a substantially rectangular shaped radiation shield 10, the radiation shield is not restricted to such a shape. The radiation shield 10 can take a variety of geometric forms including substantially triangular or square.

The container 12 is of a substantially puncture resistant material and is also substantially sturdy such that the normal use of the attachment members would not compromise the puncture resistant quality of the container. In the preferred embodiment, Vectran® is the material used. The container 12 is also generally flexible in the preferred embodiment.

The size of each radiation shield 10 is chosen such that a crewmember could position each shield without the assistance of other crewmembers in a space environment. Thus, the size can be variable depending upon such factors as the location in the spacecraft to be covered and the room available to manipulate the shields into various locations.

Figure 2:
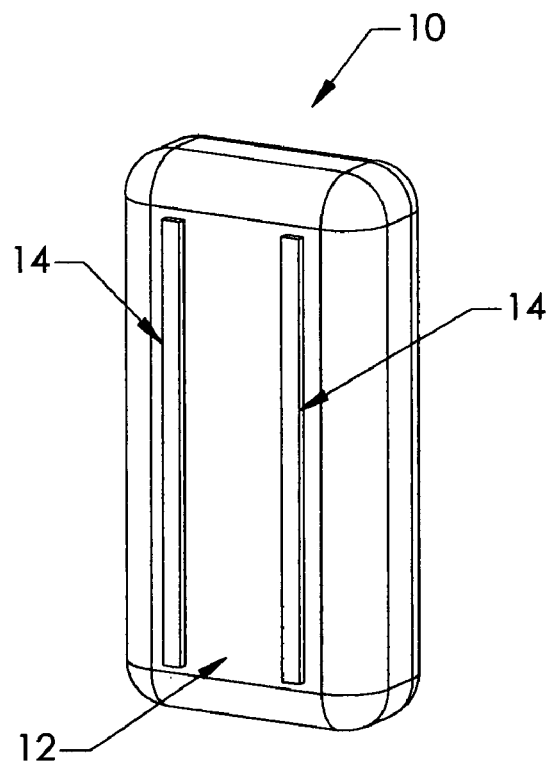
FIG. 2 is a back isometric view of a radiation shield.

FIG. 2 is a back view of the radiation shield 10 identifying second attachment members 14 disposed on the container 12. The figure depicts two attachment members 14 running substantially the length of the radiation shield 10. While this shows the preferred embodiment, other configurations are also available. The attachment members 14 may be more numerous long strips, run from side-to-side, or be other than strips and disposed in any number of patterns on the radiation shield 10.

Figure 3:
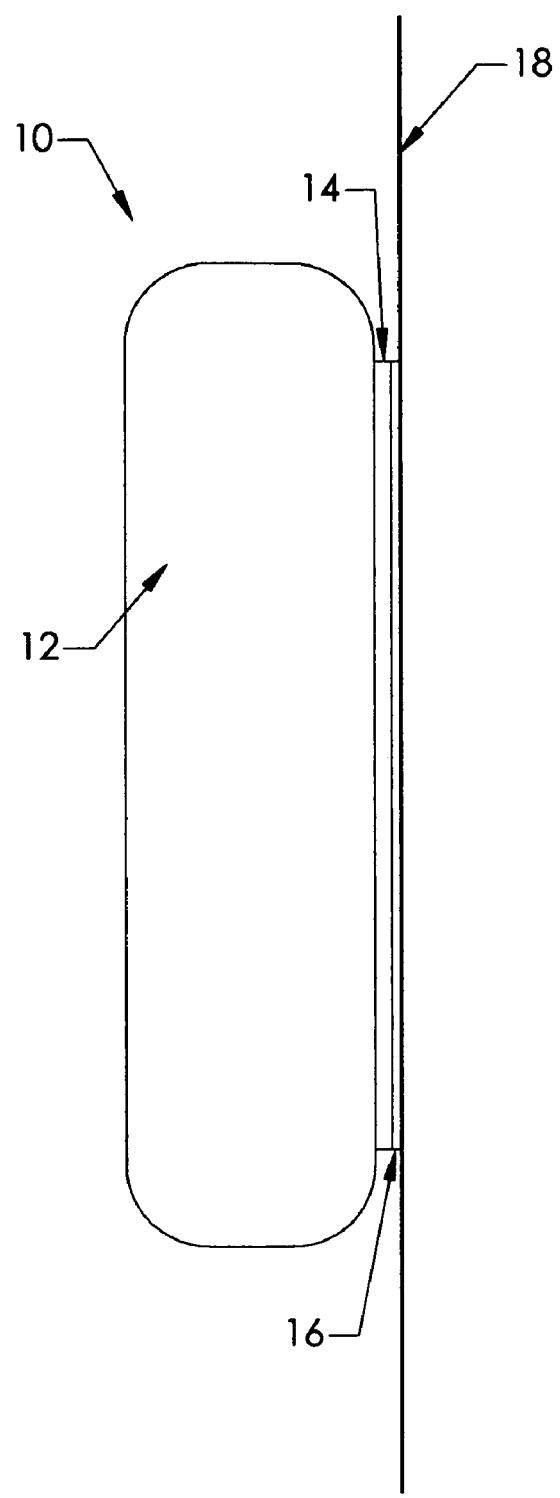
FIG. 3 is a side view of a radiation shield attached to a spacecraft.

FIG. 3 is a side view of a radiation shield 10 being secured in place on the inner surface of a spacecraft 18. The inner surface of the spacecraft 18 has a first attachment member 16 that cooperates with the second attachment member 14 on the radiation shield 10.

The attachment members 14, 16 can take a variety of forms. In the preferred embodiment, the attachment members are of a Velcro® type material. In this embodiment, the first attachment member 14 is comprised of a first strip of a Velcro-type hook material and the second attachment member 16 is comprised of a second strip of a Velcro-type loop material.

The attachment members 14, 16 can also be comprised of, respectively for example, hoop and hooks, magnetic strips, and holes and cord type arrangements.

The inside surface of a spacecraft can be any inside surface and is not restricted to a particular inner surface.

Figure 4:
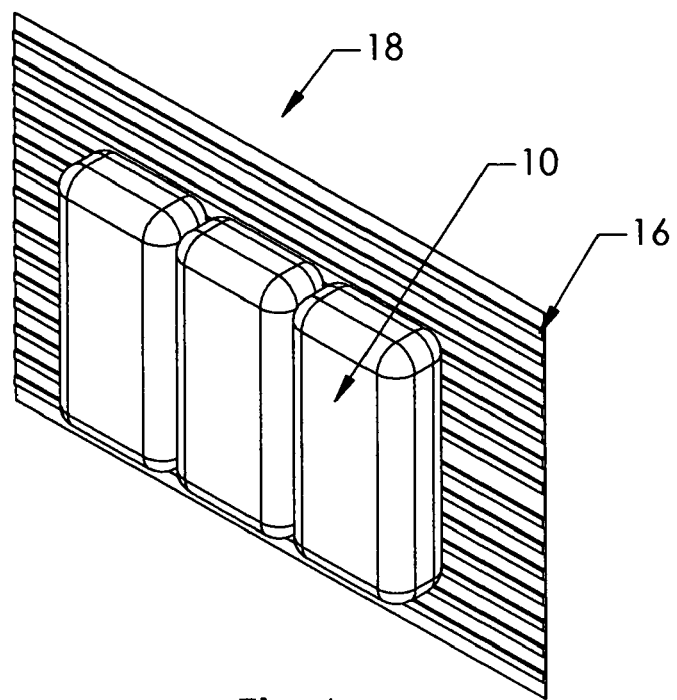
FIG. 4 is an isometric view of a number of radiation shields attached to a spacecraft.

FIG. 4 depicts a number of radiation shields 10 substantially secured in place along the inner surface of a spacecraft 18. The first attachment members 16 run in a perpendicular fashion in relation to the radiation shield 10. This is the preferred embodiment.

Figure 5:
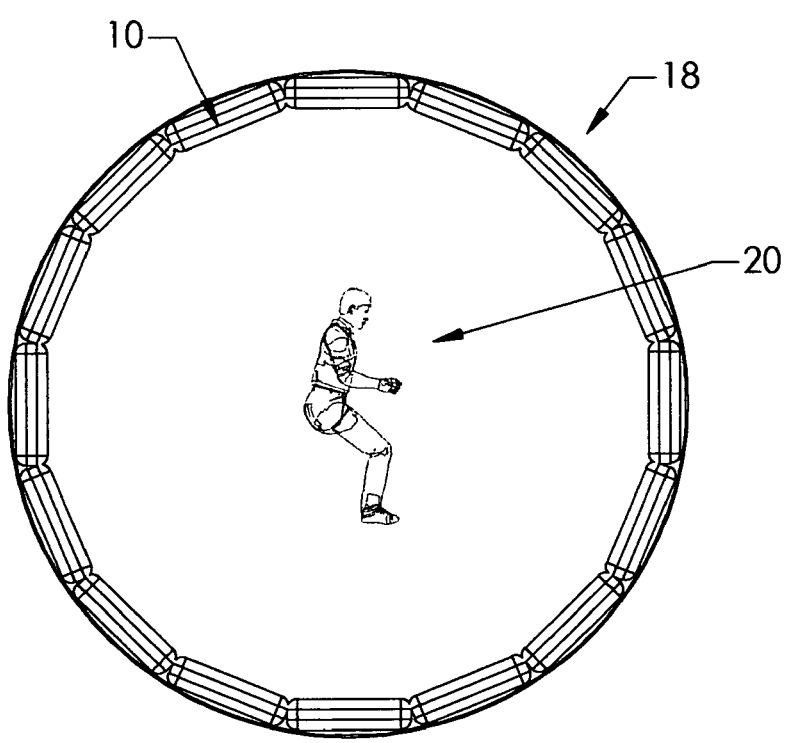
FIG. 5 is a cross-sectional view of a plurality of radiation shields disposed on a spacecraft.

Turning now to FIG. 5, a cross sectional image shows a plurality of radiation shields 10 being disposed on the inner surface of a spacecraft 18 such that a crewmember 20 is surrounded by the shields 10. In this way, radiation from any direction in the plane of the figure must first traverse the shielding before exposing the occupant to potential danger.

The choice of radiation absorbing materials and the thickness of a shield can be determined by known techniques to those skilled in the art in accordance with desired mission parameters including, but not limited to, the availability of space, the type of radiation encountered, and the cost for deploying such shields into space.

A novel radiation shield for use with a manned spacecraft has thus been described. It is important to note that many configurations can be constructed from the ideas presented. Thus, nothing in the specification should be construed to limit the scope of the claims.

What is claimed is:

1. A radiation shield comprising:
a plurality of containers filled with a material that substantially absorbs radiation;
a first attachment member disposed on each container;
a plurality of second attachment members disposed on a spacecraft inner surface; and
first and second attachment members cooperating to substantially secure the plurality of containers to the inner surface of the spacecraft;
wherein the containers being secured to the inner surface of an air containing wall and substantially cover the air containing wall of the habitable portion of the spacecraft.

2. The radiation shield of claim 1 wherein the container is comprised of a flexible material.

3. The radiation shield of claim 1 wherein the container is substantially puncture resistant.

4. The radiation shield of claim 3 wherein the first attachment member is comprised of a first strip of a hook type material and the second attachment member is comprised of a second strip of a loop type material.

5. The radiation shield of claim 3 wherein the material that substantially absorbs radiation is substantially comprised of water.

6. The radiation shield of claim 3 wherein the material that substantially absorbs radiation is substantially comprised of a gel type material.

7. The radiation shield of claim 3 wherein the material that substantially absorbs radiation is substantially comprised of a foam type material.

8. The radiation shield of claim 3 wherein the material that substantially absorbs radiation is substantially comprised of a liquid.

9. A radiation shield for use with a spacecraft having a plurality of first attachment members disposed within the spacecraft, the radiation shield comprising:
a plurality of containers being substantially sealed and each having an internal volume and a external surface;
a substantially radiation absorbing material substantially filling the internal volume of each of the containers;
a second attachment member disposed on the external surface of each of the containers; and
said first attachment member cooperating with said second attachment member for substantially securing the plurality of containers in place.

10. The radiation shield of claim 9 wherein the container is comprised of a flexible material.

11. The radiation shield of claim 9 wherein the container is substantially puncture resistant.

12. The radiation shield of claim 11 wherein the first attachment member is comprised of a first strip of a hook type material and the second attachment member is comprised of a second strip of a loop type material.

13. A radiation shield for use with a spacecraft, the radiation shield comprising: a container having an external surface and being substantially filled with a substantially radiation absorbing material; and attachment means disposed on the external surface for substantially securing the container to a spacecraft.

14. The radiation shield of claim 13 wherein the container is comprised of a flexible material.

15. The radiation shield of claim 13 wherein the container is substantially puncture resistant.

16. The radiation shield of claim 15 wherein the substantially radiation absorbing material is substantially comprised of water.

17. The radiation shield of claim 15 wherein the liquid substantially absorbs radiation.

* * * * *